US010182339B2

(12) United States Patent
Murray et al.

(10) Patent No.: US 10,182,339 B2
(45) Date of Patent: Jan. 15, 2019

(54) CELLULAR DEVICE SIM MULTIPLEXOR AND CONTROL INTERFACE

(71) Applicant: Tionesta, LLC, San Antonio, TX (US)

(72) Inventors: David C Murray, San Antonio, TX (US); James A Moryl, Helotes, TX (US)

(73) Assignee: TIONESTA, LLC, Austin, TX (US)

( * ) Notice: Subject to any disclaimer, the term of this patent is extended or adjusted under 35 U.S.C. 154(b) by 0 days.

(21) Appl. No.: 15/655,018

(22) Filed: Jul. 20, 2017

(65) Prior Publication Data

US 2018/0027406 A1    Jan. 25, 2018

Related U.S. Application Data

(60) Provisional application No. 62/365,080, filed on Jul. 21, 2016.

(51) Int. Cl.
| | |
|---|---|
| *H04W 8/18* | (2009.01) |
| *H04W 92/08* | (2009.01) |
| *H04W 88/06* | (2009.01) |
| *H04B 1/3816* | (2015.01) |

(52) U.S. Cl.
CPC .......... *H04W 8/183* (2013.01); *H04B 1/3816* (2013.01); *H04W 88/06* (2013.01); *H04W 92/08* (2013.01); *H04M 2250/14* (2013.01)

(58) Field of Classification Search
None
See application file for complete search history.

(56) References Cited

U.S. PATENT DOCUMENTS

| | | | | |
|---|---|---|---|---|
| 2010/0190526 A1* | 7/2010 | Marks | ................... | H04W 88/02 455/558 |
| 2012/0064945 A1* | 3/2012 | Kim | ....................... | G06F 9/441 455/558 |
| 2013/0023207 A1* | 1/2013 | Chen | ..................... | H04W 8/183 455/41.1 |
| 2015/0349824 A1* | 12/2015 | Cho | ...................... | H04B 1/3816 455/558 |
| 2017/0134551 A1* | 5/2017 | Batchu | .................... | H04M 1/57 |

* cited by examiner

*Primary Examiner* — Mohammed Rachedine
(74) *Attorney, Agent, or Firm* — Osha Liang LLP

(57) ABSTRACT

The present invention relates to a SIM multiplexing device that provides a mechanism for multiplexing multiple SIM cards into a single SIM device. The SIM Mux device interfaces to the host device via the host device's standard SIM slot. The SIM Mux application resides on the SIM Mux logic device and communicates with the device over the SIM slot's SIM I/O line using standard ISO-7816 messages. The SIM Mux application allows a user to select the active SIM slot via a SIM application interface and directs the logic device which SIM socket to activate on the shared SIM I/O line, thus enabling the user to utilize any one of the populated SIM cards at one time.

11 Claims, 2 Drawing Sheets

CELLULAR DEVICE SIM MULTIPLEXOR AND CONTROL INTERFACE

CLAIM OF PRIORITY TO PRIOR APPLICATION

This application claims the benefit of the filing date of U.S. Provisional Application Ser. No. 62/365,080, filed on Jul. 21, 2016, entitled "Cellular Device SIM Multiplexor and Control Interface." By this reference, the entire disclosure of U.S. Provisional Application Ser. No. 62/365,080, including the claims and drawings, is hereby incorporated into the present disclosure as though set forth in its entirety.

BACKGROUND OF THE INVENTION

1. Field of the Invention

The present invention relates to subscriber identity module (SIM) devices and automatic selection of multiple mobile networks from among several networks based on various user defined criteria from within one mobile device.

2. Description of Related Art

Cellular network providers authenticate every connection made to them from a device, for example, a mobile telephone-enabling them to choose which devices are allowed and bill the users of those devices for their usage of the network.

For common network types (GSM—Global System for Mobile Communications, UMTS—Universal Mobile Telecommunications System, LTE—Long-Term Evolution, etc), a small chip, known as a SIM card, is given to the subscriber to insert into their device; this card then acts as a trusted token providing the identity of the subscriber to the network. Regardless of the device used—smartphone, tablet, laptop, stand-alone modem—their identity with the network travels with the SIM card.

Upon receiving a communication from a particular identity, the network can then perform any appropriate actions—from granting the user access, routing phone calls, billing for services used, all the way to denying access for old identities or contacting the subscriber's home carrier to see if roaming should be allowed. The entire cellular infrastructure is built around this concept of being able to identify individual subscribers (by SIM card), with most of the functionality residing in the network itself.

SIM cards have subsequently been extended with additional capabilities to improve the network experience, distribute applications, or be used for payment services—but for the purposes of this invention, it is sufficient to think of the SIM card as a "key" that allows access to a particular network or networks.

Typical consumer cellular devices only support a single SIM card—that is, they can only access a single cellular network. To use another network, the consumer must remove the previous SIM card and insert a new one. A small percentage of devices, so-called "Dual-SIM" devices, offer a second SIM socket; the SIM in this extra socket is typically idle, and the consumer must choose which SIM is the primary/active SIM.

Many users desire the ability to choose from multiple mobile networks. For example, frequent international travelers may want to use one network in one country and another in their home country. Other users may live near a border and desire to use different providers based on which side of the border they are on. Still other users may have different signal strength networks from their home or work and desire to take advantage of the best coverage in each location. Still other users would like to keep different providers for professional and personal uses. However, the hassle of carrying multiple devices, swapping SIM cards, or the lack available SIM slots can prevent these users from fully utilizing their desired cellular services.

Therefore and for many other reasons as may be known to those of ordinary skill in the art, there is a long-felt, unresolved need for better systems and methods for providing multiple SIM to single devices. Many other prior problems, limitations, obstacles and deficiencies (collectively, "challenges") will be generally known to those of skill in the art and will otherwise be evident from the following descriptions as well as from thoughtful consideration of any claims that may be added or appended hereto or to an application claiming priority hereto.

SUMMARY OF THE INVENTION

The present invention relates to a mobile communication network device, including a mobile device that connects to the network by using a SIM card. Moreover, the invention addresses the rarity of Dual-SIM devices by providing a mechanism for multiplexing any number of SIM cards into a single- or dual-SIM device.

In an exemplary embodiment of the present invention, named a SIM Multiplexor (also referred to as a "SIM Mux device" or "SIM Multiplexor device"), multiple components comprise the mult-SIM device (3 or more). The first requirement is one or more host device interfaces that serve to expose the currently active SIM(s) to the device. In addition, a SIM switch is required. The SIM switch connects a particular socket to a particular host device interface. A control interface, which receives commands from a remote software application, is one function that sets the present invention apart from existing systems. In the preferred embodiment the application resides on our SIM multiplexor device and does not require an application to be installed onto the user's device to command/control it. Three or more SIM sockets, into which the available SIMs are inserted, allow the present invention to connect to three or more mobile networks. A remote SIM Multiplexor Application sends commands to the control interface. The SIM Multiplexor application runs from the microcontroller on the SIM Multiplexor and sniffs the SIM I/O line from the device's SIM card slot. The application communicates with the device via ISO-7816 APDU messages (the messages which SIM cards interface to cell phones) whereby multiple SIMS are tied to one device that can tie into multiple networks without any special provisioning on the Carrier side Many other objects, features, advantages, benefits, improvements and non-obvious unique aspects of the present invention, as well as the prior problems, obstacles, limitations and challenges that are addressed, will be evident to the reader who is skilled in the art, particularly when this application is considered in light of the prior art. It is intended that such objects, features, advantages, benefits, improvements and non-obvious unique aspects are within the scope of the present invention, the scope of which is limited only by the claims of this and any related patent applications and any amendments thereto.

To the accomplishment of all the above, it should be recognized that this invention may be embodied in the form illustrated in the accompanying drawings, attention being called to the fact, however, that the drawings are illustrative only, and that changes may be made in the specifics illustrated or described. For purposes of these descriptions, it should be understood that (absent clear context otherwise) the terms "cellular phone" or "wireless device" or "wireless handset", or the like are generally considered interchangeable concepts that include, but are not limited to, mobile devices, smartphones, wireless phones, and wireless devices.

DETAILED DESCRIPTION OF PREFERRED EMBODIMENT

Figure 1:
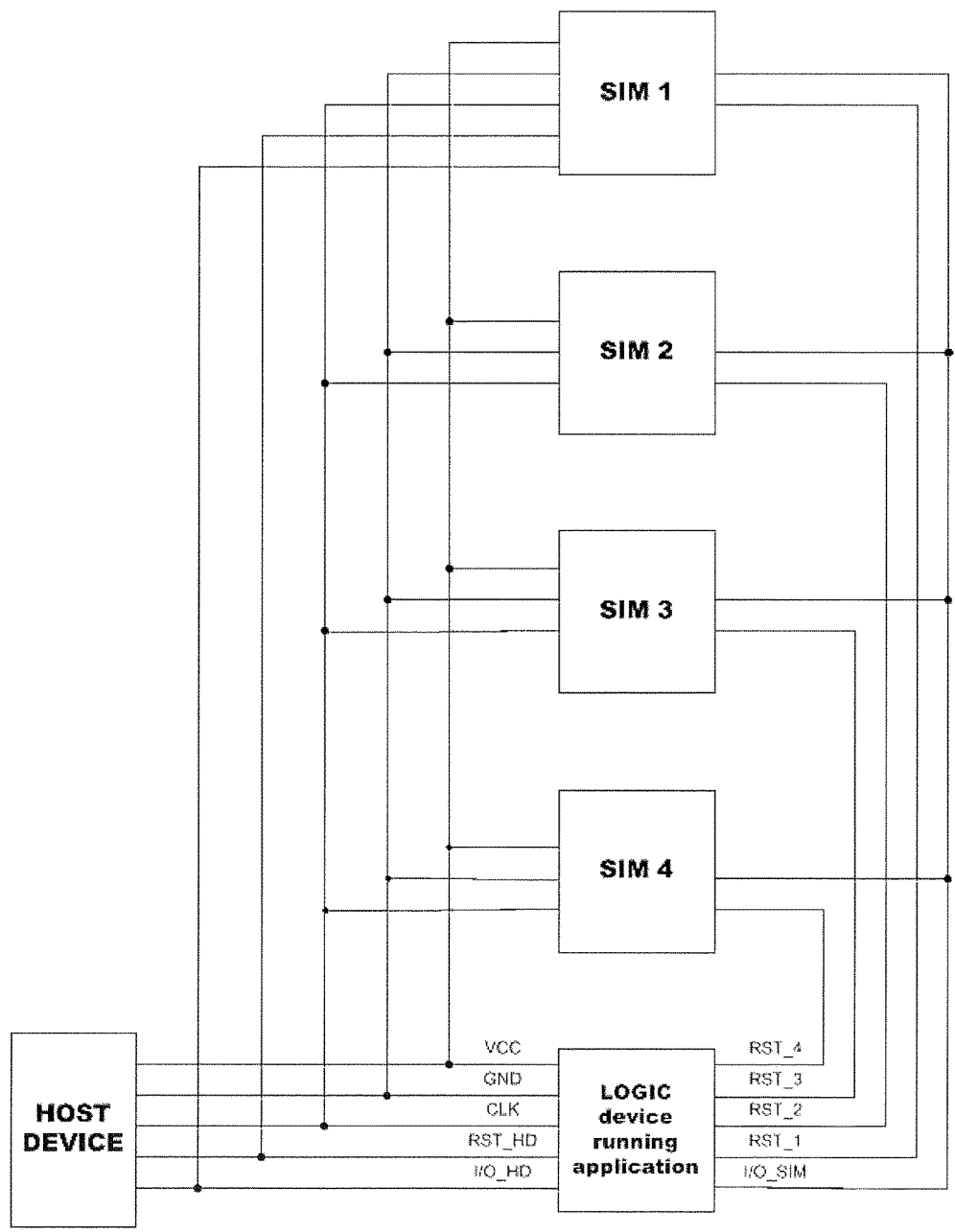
FIG. 1 is a simplified schematic block diagram of the preferred embodiment of the present invention.
Figure 2:
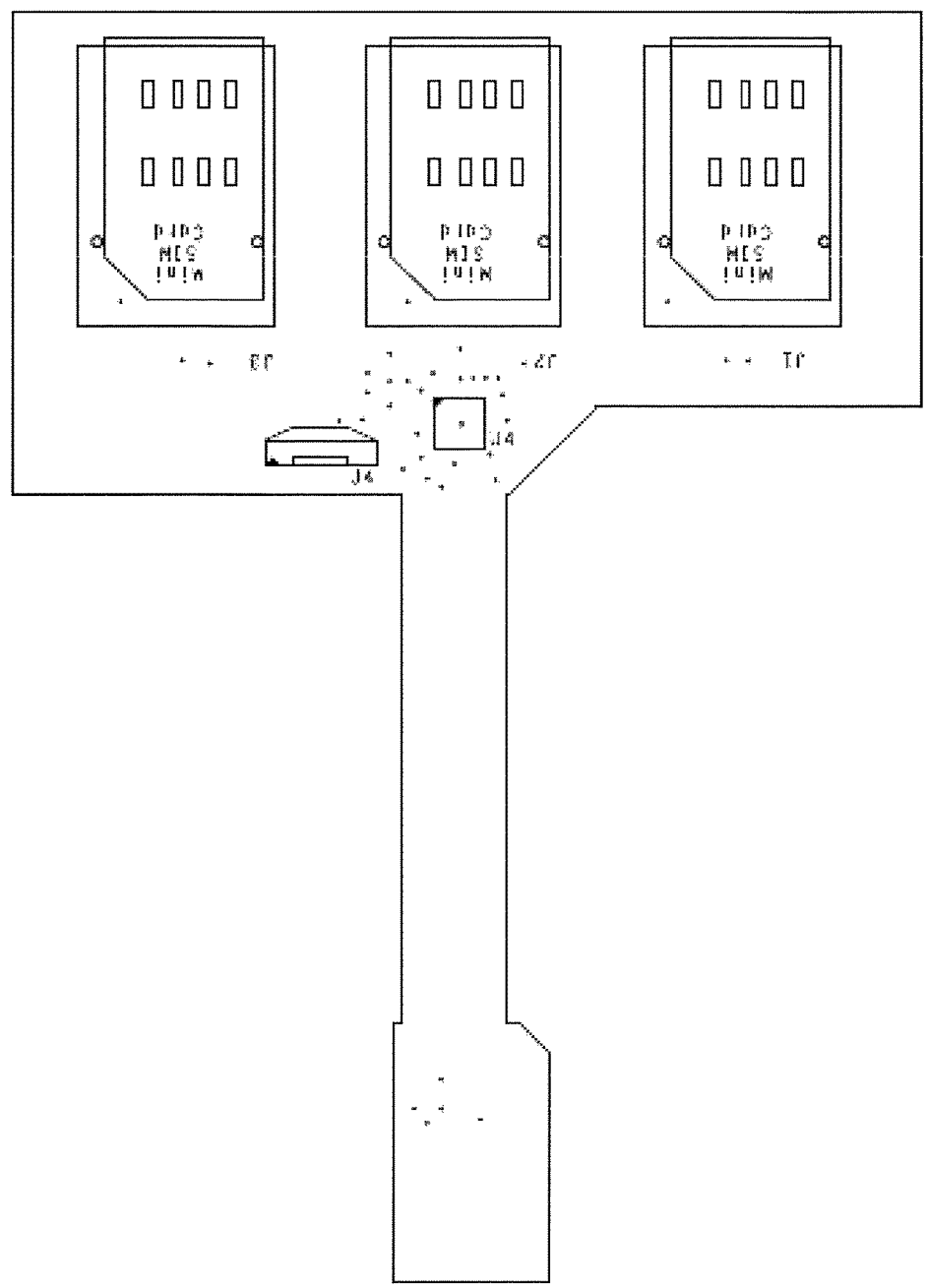
FIG. 2 is a schematic circuit diagram of an exemplary embodiment of the SIM Muliplexor.

FIG. 1 is a diagram of the major components of the invention as further described below:

The Host Interface.

The preferred embodiment of the present invention attaches to the device by way of a Host Interface. This Host Interface matches the physical and electrical characteristics of the SIM (or SIMs) supported by the device. For instance, the Host Interface may be in the form factor of a nano-SIM, micro-SIM, or mini-SIM card, with the appropriate electrical connections on the device end and attached via a cable to the SIM Multiplexor. In some embodiments the Host Interface is connected to the SIM Multiplexor via a wireless interface. In other embodiments the Host Interface is software that interfaces with the mobile device to mimic the hardware SIM slot, thus allowing the device to interact with the SIM Multiplexor The type of SIM form factor would depend on the device being interfaced with. Moreover, for the most common devices, the Host Interface may replace both the nano-SIM and the SIM tray on which it is inserted, providing a more secure fit into the device. In some embodiments the Host Interface may be built into a new case or battery for the mobile device. For embedded devices, the Host Interface may use a connector, or be soldered directly to the module.

For alternative embodiments including Dual-SIM devices, the SIM Multiplexor may expose a second Host Interface for the second SIM. Moreover, the SIM Multiplexor may expose many Host Interfaces, with the consumer using whichever Host Interface(s) is/are compatible with their device.

SIM Sockets.

In the preferred embodiment, the SIM Multiplexor hosts two or more SIM sockets into which SIM cards may be inserted. The SIM sockets accept standard-sized SIM cards (nano, micro, mini), and the sockets may be all of the same size, or be of different sizes.

It should be understood that "socket" in this case does not preclude SIM cards/chips being soldered directly to the SIM multiplexor; these are simply non-removable SIM cards that function identically to removable ones. Moreover, the SIM multiplexor may host in alternative embodiments "virtual SIMs" within an application processor and memory; these virtual SIM cards may be added and removed without any physical changes to the SIM multiplexor or insertion/removal of a card from a SIM socket. "Virtual SIMs" behave identically to a physical SIM card but are implemented in software.

SIM Switch. In the preferred embodiment, the SIM Switch connects a particular SIM in a SIM socket (removable, non-removable, or virtual) to a particular host interface. The connection is made such that the device connected to the host interface can communicate with the SIM as if it were located inside that device—the electrical connections are passed through such that the electrical interface is identical.

In an exemplary embodiment, if a SIM card from service provider 1 is located in socket 1, and a SIM card from service provider 2 is located in slot 2, and a single host interface was present, the SIM Switch may connect socket 1; this would present service provider 1's SIM card to the device. The device would be able to operate on the service provider 1's network as usual. The SIM Switch could then activate socket 2; this would remove the connection from service provider 1's SIM card and establish connection to service provider 2's SIM card instead. The device would then be able to operate on service provider 2's network.

It should be understood that the connection made between the device and the SIM does not preclude the SIM Switch acting as an intermediary, either to improve electrical characteristics (impedance, resistance, signal level, etc.) or to monitor or filter the communications between the device and SIM card. Moreover, the SIM Switch may present a specific set of electrical signals to the device while the SIM is being switched in order to encourage the device to re-initiate its connection with the SIM or to re-register to the network(s) associated with the new SIM. Thus a device reboot may not be required.

Control Interface.

In the preferred embodiment, the microcontroller runs an application, which sends APDU messages to the phone. The phone interprets those APDU messages and builds a simple UI in the options menu that allows the user to select a SIM slot. Upon selection, an APDU will be send back to the SIM Mux, and the application on the microcontroller will enable the appropriate SIM card slot.

In an alternative embodiment, the Control Interface provides an interface for controlling the SIM Switch from a remote SIM Multiplexor Application (referred to as "App"). The Control Interface receives commands from the App, sends events and data to the App, interfaces with the SIM Switch, and manages the interface between the overall SIM Multiplexor and the App. In particular, the Control Interface can receive a switch command from the App and pass it to the SIM Switch, effecting a switch in the SIM card presented to the device.

The Control Interface may interface with the App using a number of different mechanisms. In an exemplary embodiment, it may expose a Bluetooth service to which the device can connect; the App and the Control Interface may then communicate over Bluetooth. Similarly, a connection could be established with NFC, Wi-Fi, USB, or via a cable inserted into the headphone jack.

An additional option would be to communicate via "SIM toolkit" messages; these messages are carried via the SIM interface itself and are used when the device needs to communicate with the SIM or vice versa. In this embodiment, the SIM Switch receives these messages from the device and forwards them to the Control Interface for action, filtering them from the downstream SIM sockets as these messages are intended for the SIM Multiplexor and not the carrier SIM. Upstream messages from the Control Interface to the device would be first sent to the SIM Switch, which would send them to the device.

In the preferred embodiment, the primary command exposed by the Control Interface would be the switch command. The switch command allows the App to specify which SIM socket is exposed to the device (via the Host Interface). In an embodiment that multiple Host Interfaces are available, this command will specify which Host Interface should be connected to the specified SIM socket; this is of particular use on Dual-SIM devices, where the operations supported on the device differ between the active and idle SIMs.

In addition to the switch command, the Control Interface may support additional commands to improve the switching experience. These additional commands may allow the App to determine which SIMs are available, send SIM commands directly to a SIM, change the SIM Multiplexor configuration, access lookup tables stored on the SIM Multiplexor, update the firmware on the SIM Multiplexor, get a list of all supported commands, or other functions as necessary.

SIM Multiplexor App (Also Referred to as the "SIM Mux Application").

In the preferred embodiment this application will reside on the multiplexing device and manages the operation of the SIM Multiplexor. In response to a user action or application logic, the App communicates with the Control Interface to perform an action on the SIM Multiplexor.

In an alternate embodiment, the SIM Multiplexor App (or "App") is an application that runs on the consumer device that monitors the service quality and then send an APDU to the Mux application to command/control it. In response to a user action or application logic, the App communicates with the Control Interface to perform an action on the SIM Multiplexor. Different versions of the App are available based on the device platform—iOS, Android, Windows, Mac, Linux, etc.

The App may present a user interface on the device. This user interface may, for example, allow the user to select which SIM is active, thereby switching the network used by the device. The App may also have internal logic for suggesting or selecting a network automatically for the user, based on the SIMs in the SIM Multiplexor. For instance, if the SIM Multiplexor contained both AT&T and Verizon SIMs, the App may monitor the device's location and automatically switch to the highest-quality network at the current location.

In one exemplary embodiment, the App will control the device to improve the switching experience. For instance, the App will place the device into Airplane Mode before the SIM is switched, and disable Airplane Mode after the switch is completed. In another embodiment, the App will adjust the cellular modem frequencies to reduce the amount of searching the modem does to find the new network when the SIM is switched.

Operation.

In the preferred embodiment, the flow of switching between the various SIMs in the multiplexor is described as follows:

1. User removes the current SIM card (e.g. Service Provider 1) from the device and places it in SIM socket 1 in the SIM Multiplexor
2. User places a second SIM card (e.g. Service Provider 2) into SIM socket 2 in the SIM Multiplexor
3. User inserts the Host Interface cable into the SIM card slot on the device
4. User powers-on the device
5. The SIM multiplexor presents the SIM card in socket 1 to the device by default
6. The device finishes booting and attaches to the network for the SIM in socket 1 (Service Provider 1)
7. SIM Multiplexing device automatically presents the application to the user's Options menu upon boot-up
8. User access application menu
9. The Control Interface sends a command to the SIM Switch, asking it to poll the available SIMs
10. The SIM Switch talks to each SIM socket in turn, determining which sockets contain a SIM, and if occupied, any information about the SIM (home carrier, etc.)
11. The SIM Switch returns a list of available SIMs to the Control Interface
12. The Control Interface responds to the App with a list of available SIMs
13. The App presents a list of SIMs to the user
14. The user selects the SIM in socket 2 (Service Provider 2)
15. The App sends a switch command to the Control Interface, selecting socket 2 (Service Provider 2)
16. The Control Interface sends a switch command to the SIM Switch
17. The SIM switch disconnects socket 1 from the Host Interface
18. The SIM switch connects socket 2 to the Host Interface
19. The device notices a change in SIM card, and obtains the new preferred network list from the new SIM card
20. The device begins searching for the new network
21. The device finds the new network, and registers on to it using the new SIM card
22. The App indicates that the selected network is now connected.

In some embodiments of the present invention, the method and systems described are provided via computer software, via a stand-alone software application operating independently or in connection with other software systems, or some combination of the two. As well, embodiments may come in any known form and may also be implemented by hardware, software, scripting languages, firmware, middleware, microcode, hardware description languages, and/or any combination thereof.

When implemented with coded programming, it should also be understood that the program code or code segments to perform the necessary steps or tasks of alternative embodiments may be coded in solid state or may be stored in a machine-readable medium such as a computer storage medium. A code segment or machine-executable step or instruction may represent a procedure, a function, a subprogram, a program, a routine, a subroutine, a module, a software package, a script, a class, or any combination of instructions, data structures, and/or program statements. Executable code segments may also be coupled to other code segments or to a hardware circuit by passing and/or receiving information, data, arguments, parameters, and/or memory contents, which may be passed, forwarded, or transmitted via any suitable means including memory sharing, message passing, token passing, network transmission, etc.

Specific details are given in the above description to provide a thorough understanding of various preferred embodiments. However, it is understood that these and other embodiments may be practiced without these specific details. For example, processes may be shown in block diagrams in order not to obscure the embodiments in unnecessary detail. In other instances, well-known processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have many additional steps not included in the figure. A process may correspond to a method, a function, a procedure, a subroutine, a subprogram, etc. When a process corresponds to a function, its termination corresponds to a return of the function to the calling function or the main function.

Embodiments of the invention may involve use middleware and/or other software implementation; the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may be downloadable through an internet connection service. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

The invention claimed is:

1. A subscriber identity module multiplexer device (SIM Mux) for maximizing network characteristics of a portable computer communication device by actively multiplexing multiple SIM cards into a single device comprising:
   a plurality of SIM sockets for a plurality of SIM cards;
   at least one host interface that interfaces with a SIM card slot of said portable computer communication device;
   a SIM switch coupled with a processor that monitors communications between the SIM Mux and the SIM cards, the SIM switch causing the processor to connect a particular one of the plurality of SIM sockets to the at least one host interface, wherein:
      the SIM switch causes the processor to bypass control commands from the portable computer communication device,
      the processor activates, deactivates, monitors, and selects from among said plurality of SIM cards based on current networking characteristics of each individual network for said plurality of SIM cards, and
      at least one of the plurality of SIM sockets is in electronic communication with the processor; and
   a SIM Mux application stored in a memory of the SIM Mux, wherein the SIM Mux application manages the operation of said processor and provides said portable computer communication device with information and controls related to said plurality of SIM cards;
   wherein an objective is enabled relative to said portable computer communication device or to the network characteristics associated with said portable computer communication device, said objective including one or more of the following:
      network connectivity is increased, network costs are reduce, accuracy network communication is increased, network time required to respond is decreased, and network errors are reduced.

2. The SIM Mux of claim 1, wherein a short-range wireless communication system is used to communicate information to the processor from the host interface.

3. The SIM Mux of claim 1, wherein at least one of the plurality of SIM sockets is compatible with a virtual SIM card.

4. The SIM Mux of claim 1, wherein the SIM Mux enables the portable computer communication device to switch between and use the plurality of SIM cards without having to turn off the portable computer communication device.

5. The method of claim 1, wherein the SIM Mux comprises three or more SIM Sockets.

6. A method for maximizing network characteristics of a portable computer communication device by actively multiplexing multiple subscriber identity module (SIM) cards into a single device comprising:
   using a SIM Multiplexor device (SIM Mux) with the portable computer communication device, wherein the SIM Mux comprises:
      a plurality of SIM sockets for a plurality of SIM cards;
      a SIM switch coupled with a processor that communicates with the plurality of SIM cards, wherein:
         the SIM switch causes the processor to bypass control commands from the portable computer communication device,
         the processor activates, deactivates, monitors, and selects from among said plurality of SIM cards based on current networking characteristics of each individual network for said plurality of SIM cards, and at least one of the plurality of SIM sockets is in electronic communication with the SIM switch;

a host interface that interfaces with at least one SIM card slot of said portable computer communication device and for communicating said processor;

a SIM Mux application stored in a memory of the SIM Mux, wherein the SIM Mux application manages the operation of said processor and provides said portable computer communication device with information and controls related to said plurality of SIM cards; and enabling an objective relative to said portable computer communication device or to the network characteristics associated with said portable computer communication device, said objective including one or more of the following: increasing network connectivity, reducing network costs, increasing accuracy of network communication, decreasing time required to respond to network, and reducing network errors, wherein the SIM Mux comprises three or more SIM Sockets.

7. The method of claim 6, wherein a short-range wireless communication system is used to communicate information to the processor from the host interface.

8. The method of claim 6, wherein at least one of the plurality of SIM sockets is compatible with a virtual SIM card.

9. The method of claim 6, wherein the SIM Mux enables the portable computer communication device to switch between and use the plurality of SIM cards without having to turn off the portable computer communication device.

10. The method of claim 6, wherein the host interface is a new case or battery for a mobile device.

11. The method of claim 6, wherein:

the SIM Mux comprises at least two host interfaces, the SIM switch causes the processor to compare a current network quality for each of the plurality of SIM cards connected to the host interfaces, the network quality of each SIM card is an aggregate of the current networking characteristics of each individual network, and the SIM switch causes the processor to determine the host interface with a highest network quality based on the results of the network quality comparison.

* * * * *